United States Patent [19]

Bingham

[11] Patent Number: 5,539,603
[45] Date of Patent: Jul. 23, 1996

[54] CURRENT PROTECTION METHOD AND APPARATUS AND CURRENT PROTECTED LOW DROPOUT VOLTAGE CIRCUITS

[75] Inventor: David Bingham, San Jose, Calif.

[73] Assignee: Maxim Integrated Products, Sunnyvale, Calif.

[21] Appl. No.: 204,483

[22] Filed: Mar. 2, 1994

[51] Int. Cl.$^6$ .................................................. H02H 9/00
[52] U.S. Cl. ................... 361/56; 361/90; 361/18
[58] Field of Search .................................... 361/18, 58, 90, 361/56; 323/276

[56] References Cited

U.S. PATENT DOCUMENTS

| | | | |
|---|---|---|---|
| 3,754,182 | 8/1973 | Morris et al. | 361/18 |
| 4,809,122 | 2/1989 | Fitzner | 361/18 |
| 4,835,649 | 5/1989 | Salerno | 361/18 |

Primary Examiner—Jeffrey A. Gaffin
Assistant Examiner—Sally C. Medley
Attorney, Agent, or Firm—Blakely, Sokoloff, Taylor & Zafman

[57] ABSTRACT

A current limited low dropout voltage circuit for coupling between first and second power supply terminals and an output terminal for providing a current limited low dropout voltage output having a MOS pass transistor coupled in series between the first power supply terminal and the output terminal, a drive circuit coupled to the gate of the MOS pass transistor, circuitry for limiting the gate-source voltage of the MOS pass transistor to limit the maximum current therethrough to a first maximum current level when the voltage between the second power supply terminal and the output terminal is less than a predetermined value, and circuitry for limiting the gate-source voltage of the MOS pass transistor to limit the maximum current therethrough to a second maximum current level when the source to drain voltage of the MOS pass transistor is greater than a predetermined voltage difference and the voltage between the output terminal and the second power supply terminal is greater than the predetermined value, the second maximum current level being greater than the first maximum current level.

18 Claims, 4 Drawing Sheets

CURRENT PROTECTION METHOD AND APPARATUS AND CURRENT PROTECTED LOW DROPOUT VOLTAGE CIRCUITS

BACKGROUND OF THE INVENTION

1. Field of the Invention

The present invention relates to the field of amplifiers, buffers, power supply circuits and the like wherein overload protection is needed and wherein operation capabilities near the power supply rail are required.

2. Prior Art

This invention is particularly relevant in the field of amplifiers, buffers, power supply circuits, etc. where the output load may be ill defined for many applications. For example, power supply circuits may be subject to short circuit loads in fault conditions and/or have loads that may be highly capacitive so that at startup, unless constraints are imposed, extremely high values of initial current would result. In general most electronic functions that supply large amounts of power (in an absolute sense) into loads have to have protection against overloads. Fuses, circuit breakers and current limiting schemes are commonly used for power source protection.

This disclosure describes a method of protecting an error amplifier, buffer or equivalent using, but not limited to, a MOS pass transistor amongst other circuitry, connecting a power source to a load.

To illustrate the problems that the present invention is trying to solve, the low dropout voltage positive series regulator of FIG. 1 will be described. This regulator employs a conventional P-MOS pass element and operates with an input supply voltage greater than its output voltage. The load at the output will generally consist of a resistive element $R_L$ (dissipative) and a parallel capacitive element $C_L$ (generally used for stability of the regulator's error amplifier and to compensate for the normally poor high frequency power supply and load regulation of the same). It is also one of the requirements of the regulator that it can survive an output short circuit condition.

FIG. 1 shows a simple block schematic of the low dropout voltage regulator. Low dropout voltage refers to the low voltage that would occur across the P-MOS transistor as the supply voltage is reduced to a value slightly greater than the output voltage. Stated alternatively, low dropout voltage regulators that can provide a voltage regulated power output up to voltages approaching the input supply voltage to the regulator. Many regulators have dropout voltages of greater than 1 volt. The regulator shown has the capability of providing dropout voltages of less than 0.1 volt at moderate to low output currents.

One of the problems of low dropout voltage regulators is how to determine what the current is through the pass element without affecting the dropout voltage. One method is to place a resistor in series with the pass element and to monitor the voltage across this resistor. For low dropout voltage regulators, this is undesirable because the voltage produced across the resistor adds to the total dropout voltage.

As an example of a practical requirement for a low dropout voltage regulator, a power supply will be considered having an output current requirement of 250 milliamperes at 5 volts with a dropout voltage of 125 mv when the input supply is 5 volts. This implies an "ON" or "Saturation" resistance of 0.5 ohm for the pass element in dropout. The pass transistor would therefore have to be designed such that, with a gate to source voltage of not more (and probably less) than the input supply voltage, the transistor would have an ON resistance of 0.5 ohm. The problem is that with such a transistor, if the output is shorted to GND, the transistor will be able to supply several amps of current depending upon the parameters of the transistor (threshold voltage, channel carrier mobility, etc.). This is clearly undesirable from both an excessive power supply consumption consideration because of the limited ability to dissipate that power in the pass transistor without exceeding potentially dangerously temperatures, and the limited ability of the connections to the pass transistor to handle high values of current. Since power is the product of voltage and current, either voltage or current can be high but not both simultaneously. In many applications, this voltage can have any value up to the input power supply voltage. Therefore, the maximum value(s) of current in the pass element must be controlled to protect the system. The multilevel control of the current through the pass element is what the invention achieves.

It is almost impossible to define an ideal current limiting scheme for a general purpose amplifier, regulator, etc. since the desired operating, overload and transient conditions can be so varied. For example, for a DC system where startup time is unimportant, and with an output requirement of say 100 ma, a scheme that limits the maximum output current to 110 ma may be fine if there is not a dropout requirement. This is because in order to obtain the lowest possible dropout voltage, it is desirable, when using a MOS pass transistor, to apply as high a gate to source voltage as possible. Accordingly, the on resistance of this transistor is very low and if a current detection scheme is not used, as the dropout voltage is increased, the pass transistor current could increase to many times the desired maximum value. If as, in most real case situations, the load has AC requirements such as rejection of high frequency noise, and high frequency error amplifier loop stability, etc., the load has to be decoupled with a large capacitor which places different and usually much more severe restrictions on protection schemes in addition, of course, to the dropout requirements. This is the reason for there being so many current limiting and power protection circuits in current usage.

BRIEF SUMMARY OF THE INVENTION

A current limited low dropout voltage circuit for coupling between first and second power supply terminals and an output terminal for providing a current limited low dropout voltage output having a MOS pass transistor coupled in series between the first power supply terminal and the output terminal, a drive circuit coupled to the gate of the MOS pass transistor, means for limiting the gate-source voltage of the MOS pass transistor to limit the maximum current therethrough to a first maximum current level when the voltage between the second power supply terminal and the output terminal is less than a predetermined value, and means for limiting the gate-source voltage of the MOS pass transistor to limit the maximum current therethrough to a second maximum current level when the source to drain voltage of the MOS pass transistor is greater than a predetermined voltage difference and the voltage between the output terminal and the second power supply terminal is greater than the predetermined value, the second maximum current level being greater than the first maximum current level.

DETAILED DESCRIPTION OF THE INVENTION

Figure 1:
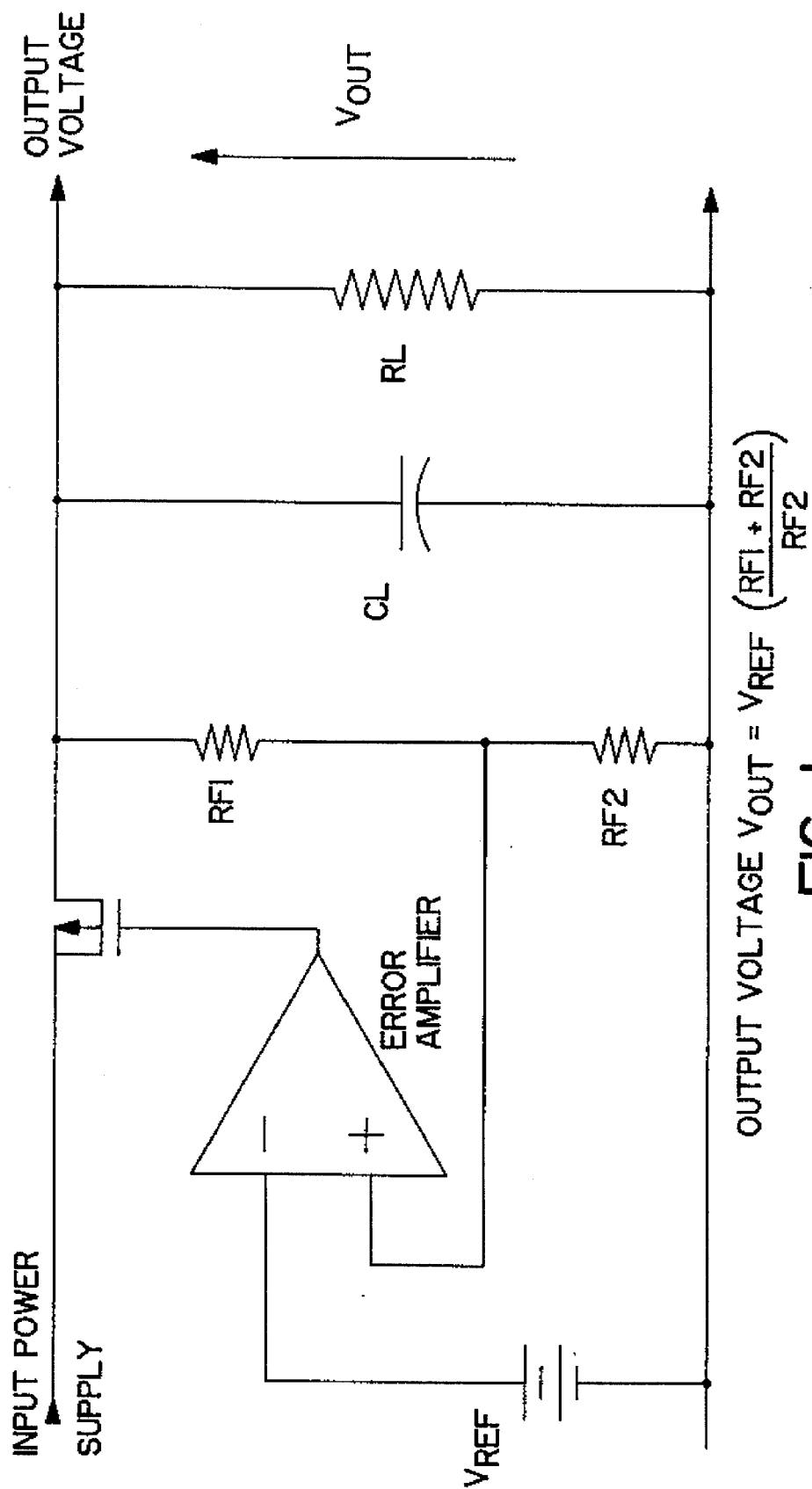
FIG. 1 presents a simple block schematic of a low dropout voltage linear voltage regulator.

The essence of this invention is to limit the current through the pass element of an amplifier, buffer, power supply circuit or the like so that it can never be damaged by either excessive current or power. This is achieved by sensing the voltage across the load and the voltage across the pass element and fixing the maximum turn-on potentials that can be applied to the control terminal of the pass element (in the case of a MOS transistor, its gate to source voltage). A particularly simple and convenient implementation of this scheme that provides a good compromise in safety protection and complexity is to define three separate areas of operation for the system:

The first is where the voltage $V_1$ across the load (short circuit load, and/or highly capacitive load at startup) is less than a very small value, which in practice might be around 1 volt. In this region the maximum current in the pass element is limited to a low value $I_1$ such that the pass element is not damaged even if the output is continuously short circuited. In this mode the power dissipated by the pass element is the product of this current $I_1$ and the input supply voltage less the voltage across the load $V_1$.

The second area of operation limits the current through the pass element to a higher current value $I_2$. This second value is dependent upon there being a voltage across the load in excess of the maximum value of $V_1$ defining the first area of operation, and also that the value of the voltage across the pass element be greater than a second value $V_2$. In this mode the maximum power in the pass element is the product of the input supply voltage less $V_1$ and its current $I_2$. The value of $I_2$ is chosen to be significantly greater than $I_1$, though still within the safe power dissipation capability of the pass MOS transistor.

The third region (dropout) is where the voltage $V_3$ across the pass element is low (generally a small fraction of the input supply voltage). In this region the current $I_3$ through the pass element is defined by the saturation resistance of the pass element and the voltage $V_3$. By choosing appropriate values of pass element saturation resistance and $V_3$, the value of $I_3$ can be made significantly greater than either $I_1$ or $I_2$ without incurring excessive power dissipation.

The above described current/power limiting scheme can, of course, be further enhanced by the addition of thermal shutdown schemes that, in general, allow the values of the 3 currents $I_1$, $I_2$, and $I_3$ to be made higher than in simple non thermally protected systems. This is because the thermal shutdown schemes will turn off or reduce operating currents in pass elements if high temperatures are encountered due to overload, etc.

The invention described here, as with all current limiting schemes, is a compromise that, in this case, does not affect the low dropout voltage region where a very low ON resistance is required but places current limits on the pass element for all other operating conditions. For a short circuit (very low impedance) load it is assumed that the voltage across the load will also be a very low value. The value of the load voltage is monitored and, if below an assigned value, the current limiting scheme controls the maximum value of pass current to a low value. If the voltage across the load is greater than this preset value (not a short circuit) and if the voltage across the pass element is greater than approximately its maximum designated dropout voltage the maximum current through the pass element is limited to a level above its short circuit value but much less than the maximum value that the pass element is capable of. If the voltage across the pass transistor is less than the maximum designated dropout voltage, its gate drive is allowed to be the maximum possible.

Figure 2:
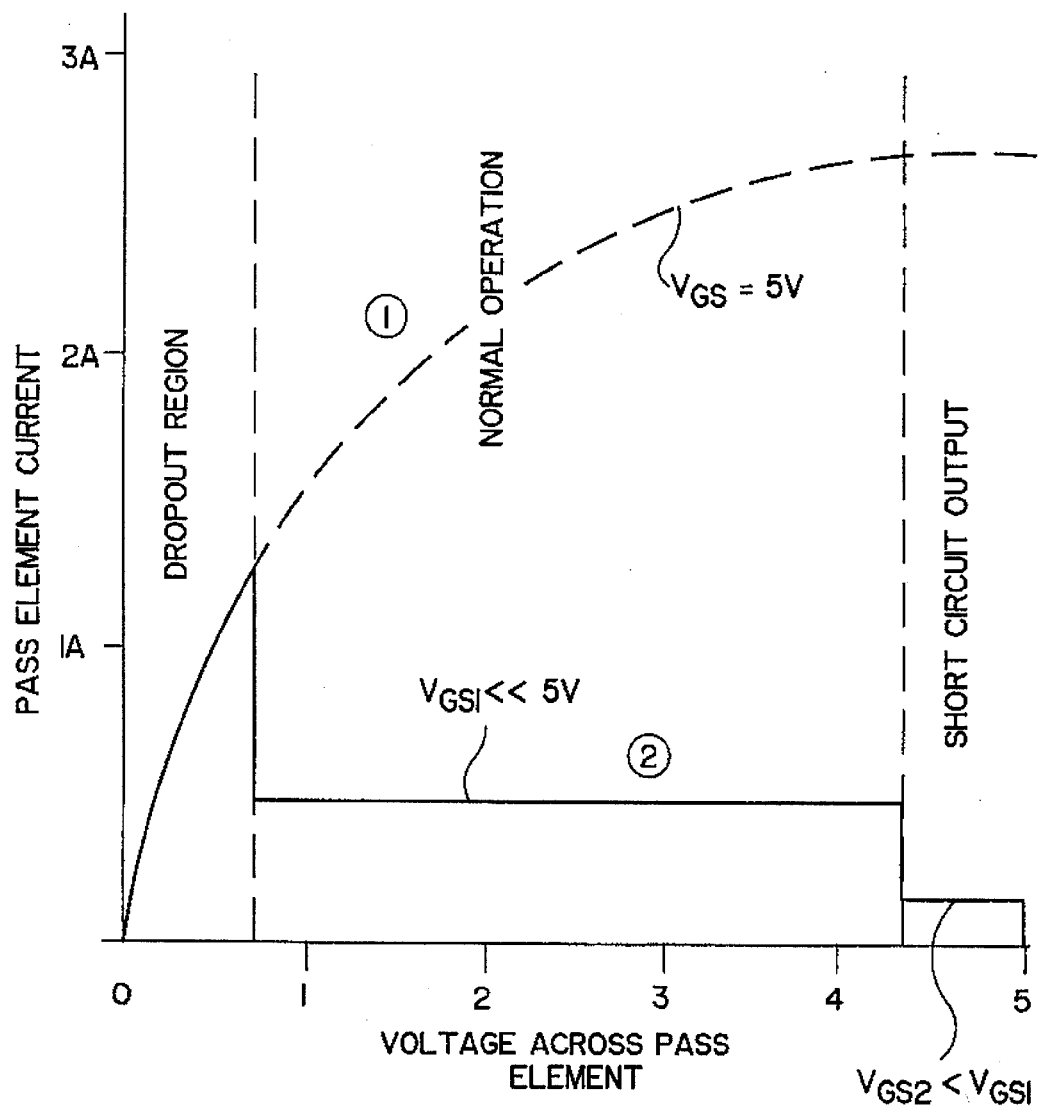
FIG. 2 presents graph of drain current as a function of drain to source voltage for a P-channel MOS transistor whose gate to source voltage is approximately 5 volts, and a second graph presenting the drain current as a function of drain to source voltage as in the first graph in the dropout region, but significantly reduced in the normal region and even more reduced in the region simulating output short circuit conditions.

FIG. 2 shows a graph of the drain current as a function of drain to source voltage of a P- channel MOS transistor whose gate to source voltage is connected to the full voltage compliance, which is approximately 5 volts in FIG. 2 (graph 1) of the example, resulting in a value of drain current of almost 3 amps. The second graph shows the drain current as a function of drain to source voltage, the same as in graph 1 in the dropout region, but significantly reduced in the normal region and even more reduced in the region simulating output short circuit conditions. The reductions in drain currents are produced by reducing the applied gate to source (turnon) voltages of the pass transistor accordingly.

Figure 3:
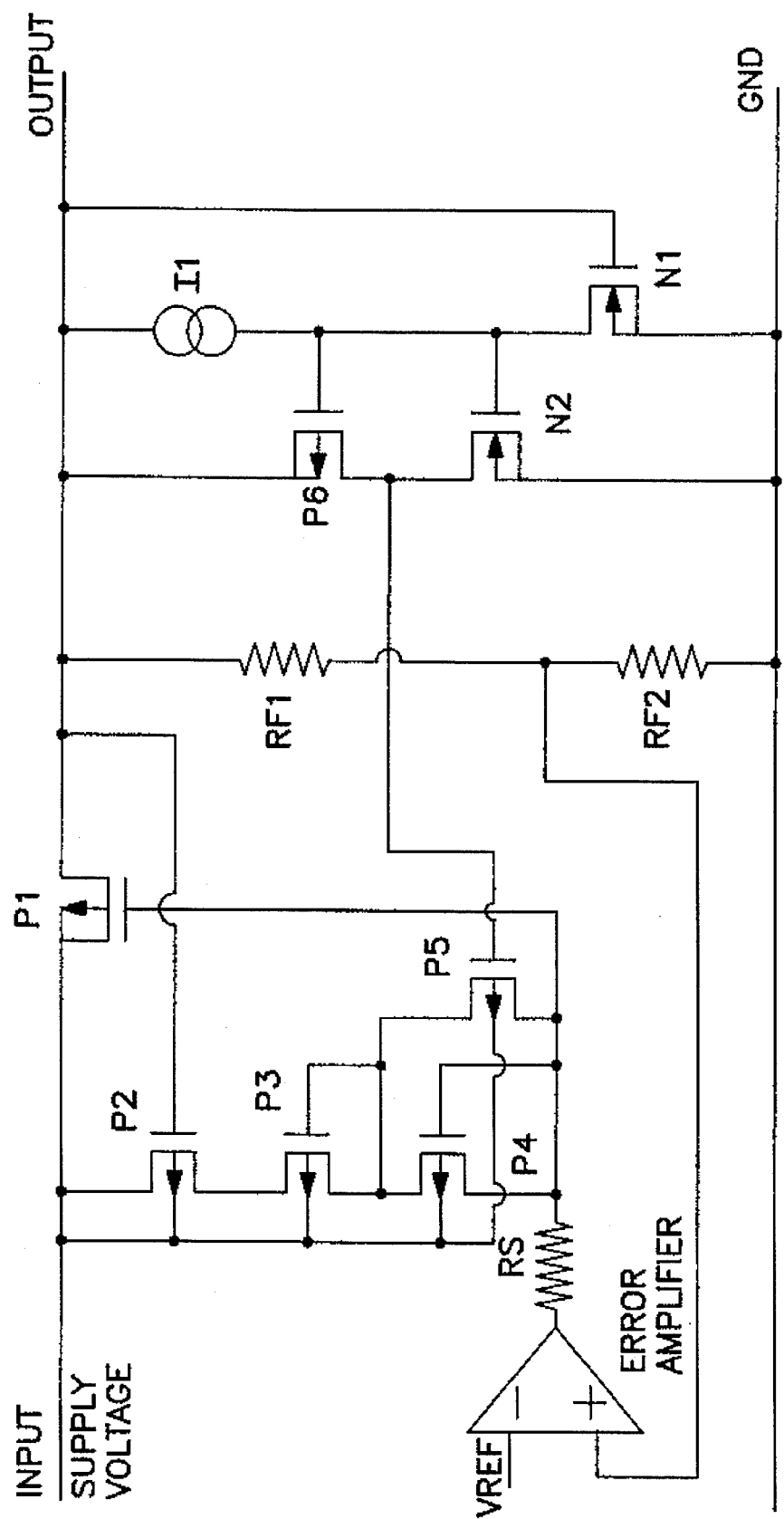
FIG. 3 is a block schematic of a practical implementation of a low dropout voltage regulator incorporating the current limiting characteristics of the second graph of FIG. 2 in accordance with the present invention.

A block schematic of a practical implementation of the present invention is shown in FIG. 3. The essence of the circuit is to detect, using very crude voltage detectors, the voltages across the load and the voltage across the pass transistor, and to limit the turnon voltage at the gate to either a high value based on the input voltage VCC - $V_{out}$ (dropout), a medium voltage (normal operation) or a low voltage (output short circuit). Referring to FIG. 3, an error amplifier drives the gate of the pass transistor P1 through a high value resistor RS. The transistors P2, P3, P4 and P5 are used to clamp the gate to source voltage of P1 in order to limit the values of its maximum drain current. If the drain to source voltage of P1 is less than the threshold or turnon voltage (approx. 0.8 volt) of P2, P2 will be off and the maximum gate to source voltage of P1 is limited only by the drive from the error amplifier. This region of operation is defined as the dropout region where the voltage across P1 can range from 0 to about 0.8 volt. If the voltage across P1 is greater than 0.8 volt, P2 will be turned on. Now assuming the voltage at the output is greater than the threshold or turnon voltage of N1 (approximately 0.8 volt) the output of the inverter P6, N2 will be high and P5 will be off. Therefore since P3 and P4 are connected as diodes, the maximum gate to source voltage of P1 can be limited to about 2.5 volts based on the threshold characteristics of the transistors P3 and P4 (small geometries using small values of channel widths to channel lengths, and choice of turnon voltages). The third condition is when the output voltage is so low (less than 0.8 volt) that N1 is off. This results in the output of inverter P6, N2 being low which turns on P5 which in turn shorts out P4. In this case the clamp which limits the gate drive to P1 is solely due to the diode connected transistor P3 resulting in a maximum gate drive to P1 of about 1.5 volts.

Clamping the gate of P1 in the above described manner produces the current limiting curve shown in FIG. 2. Of course FIG. 3 shows one very simple method of clamping the gate voltage of P1. There are many other ways to achieve voltage detection and voltage clamping and this particular scheme is therefore one of very many. An advantage of the described method is its simplicity in terms of the number of devices used. Due to reliance on turnon voltages of transistors that can vary significantly, its accuracy is relatively poor, but never-the-less adequate for many applications.

Figure 4:
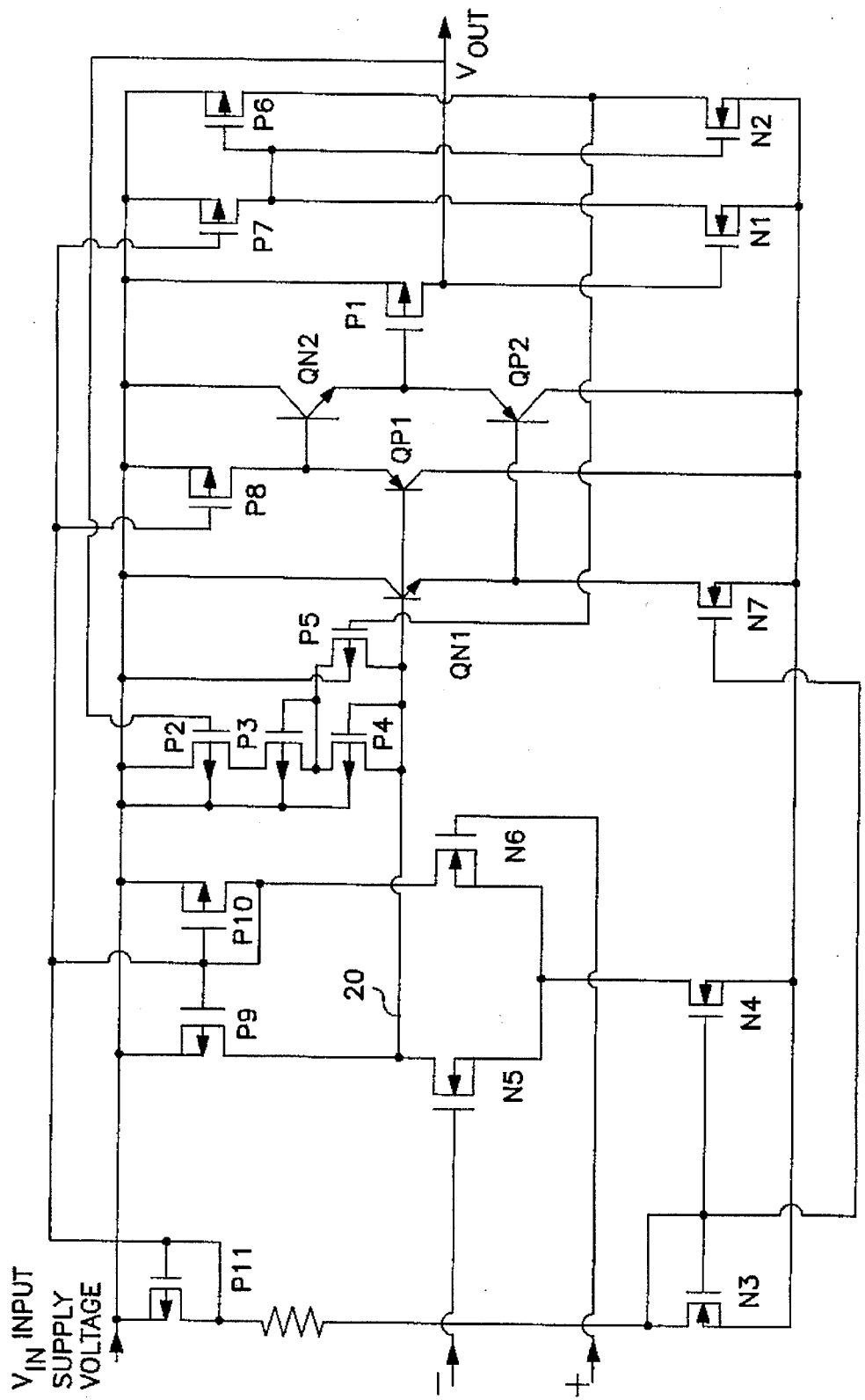
FIG. 4 is a circuit diagram for the simple regulator circuit of FIG. 3 in an improved and completed circuit form.

The simple regulator circuit shown in FIG. 3 is shown in an improved and completed form in FIG. 4. This schematic shows the error amplifier using individual components instead of as a block representation. This type of amplifier has a high output impedance so that the clamp circuit can be connected directly to its output. For good high frequency performance it is desirable to drive the gate of the pass transistor P1 with a low impedance drive. This is because in most applications, the pass transistor would be large in size in order to provide a high output current. This in turn results in it having a high value of gate capacitance. This gate capacitance, if placed in parallel to the high output impedance of the error amplifier, produces a pole which can degrade the high frequency performance of the system. Buffering the gate with the complementary double emitter follower (transistors QN1,QP2 and QP1,QN2) effectively moves this pole to a much higher frequency.

The transistor designations used in FIG. 3 are also used in FIG. 4 wherever applicable, so that devices similarly identified have the same function as described with respect to FIG. 3. In the circuit of FIG. 4, transistor P11 and the resistor coupled in series therewith provide a current through transistor N3 connected as a diode. The current through transistor N3 is mirrored to transistors N4 and N7 by the gate source voltages thereof being held to the gate source voltage of transistor N3. Similarly, the current in transistor P10 is mirrored to transistors P9, P8 and P7, the current through transistor P7 providing the function of the current source $I_1$ of FIG. 3. The current through transistor N5 plus the current through N6 must equal the current through transistor N4. When the differential input voltage to the input stage is zero, the current in transistors P10, N6, P9 and N5 will be equal to each other and each equal to one half the current in transistor N4. Suppose now a differential input turns transistor N6 on more than transistor N5. The sum of the currents in transistors N5 and N6 will still equal the current in transistor N4, but the current through transistor N6 will be greater than one half of the current through transistor N4 and the current through transistor N5 will be less than one half of the current through transistor N4. The higher current through transistor N6 is mirrored through transistor P10 to transistor P9. Thus the difference in current through transistors N5 and N6 appears as the single ended output current of the differential input stage on line 20. This single ended output of the differential input stage on line 20, being a current rather than a voltage, is by definition a high impedance output, duplicating the effect of resistor RS of FIG. 3.

With a zero differential input voltage, the current in line 20 will be substantially zero. The currents mirrored to transistors N7 and P8 set the currents through transistors QN1 and QP1 respectively, with the voltage of the gate of transistor P1 being substantially equal to the voltage on line 20. In that regard, the current through the series combination of transistors QN2 and QP2 is that current which will make the base emitter voltages sum to the same value, specifically so that $VBE_{QP1} - VBE_{QN2} = VBE_{QP2} - VBE_{QN1}$. Even though the impedance of line 20 is high, obviously the impedance of the drive on the gate of transistor P1 is low in accordance with the desired objective.

When there is a differential input to the error amplifier, for example so as to increase the current in transistor N6, decrease the current in transistor N5 and increase the current in transistor P10, the voltage on line 20 will increase. This high impedance line is then buffered by the double complementary emitter follower QN1, QP1 and QN2, QP2 driving the gate of the pass transistor P1. Thus the high impedance line 20 can have its instantaneous voltage change rapidly by a small change of current in P9 and N5 without the large gate capacitance of P1 impeding this rapid change in voltage. When current limiting is called for, however, transistors P2, P3, P4 and P5 will limit the negative voltage excursion on line 20 as previously explained, thereby limiting the voltage on the gate of the pass transistor P1.

Thus, while the present invention has been disclosed and described with respect to a certain preferred embodiment thereof, it will be understood to those skilled in the art that the present invention may be varied without departing from the spirit and scope of the invention.

I claim:

1. A circuit for coupling between first and second power supply terminals and an output terminal for providing a current limited low dropout voltage output comprising:

a MOS pass transistor having a source, a drain and a gate, the source and drain of the pass transistor being coupled in series between the first power supply terminal and the output terminal;

a drive circuit having an output coupled to the gate of the MOS pass transistor;

means for limiting the gate-source voltage of the MOS pass transistor to limit the maximum current therethrough to a first maximum current level when the voltage between the second power supply terminal and the output terminal is less than a predetermined value, the first maximum current level being a current greater than zero; and, means for limiting the gate-source voltage of the MOS pass transistor to limit the maximum current therethrough to a second maximum current level when the source to drain voltage of the MOS pass transistor is greater than a predetermined source-drain voltage difference and the voltage between the output terminal and the second power supply terminal is greater than the predetermined value, the second maximum current level being greater than the first maximum current level.

2. The circuit of claim 1 wherein the MOS pass transistor is a P-channel MOS transistor and the first power supply terminal is a positive power supply terminal.

3. The circuit of claim 1 wherein the means for limiting the gate-source voltage of the MOS pass transistor to limit the maximum current there through to a first maximum current level when the voltage between the output terminal and the second power supply terminal is less than said predetermined value includes a second MOS transistor having a source, a drain, a gate, and a threshold voltage, the source and gate of the second MOS transistor each being coupled to one of the second power supply and the output terminals so as to turn on the second MOS transistor when the voltage between the output and second power supply terminals reaches the threshold voltage of the second MOS transistor.

4. The circuit of claim 1 wherein the means for limiting the gate-source voltage of the MOS pass transistor to limit the maximum current there through to a second maximum current level when the source to drain voltage of the MOS pass transistor is greater than a predetermined voltage difference and the voltage between the output terminal and the second power supply terminal is greater than the predetermined value includes:

a second MOS transistor having a source, a drain, a gate, and a threshold voltage value, the source and gate of the second MOS transistor each being coupled to one of the second power supply and the output terminals so as to turn on the second MOS transistor when the voltage between the output and second power supply terminals reaches the threshold voltage of the second MOS transistor; and a third transistor having a source, a drain, a gate, and a threshold voltage, the gate and source of the third MOS transistor each being coupled to one of the source and drain of the first MOS transistor so as to turn on the third MOS transistor when the voltage between the source and drain of the first MOS transistor reaches the threshold voltage of the third MOS transistor.

5. The circuit of claim 1 wherein the means for limiting the gate-source voltage of the MOS pass transistor to limit the maximum current therethrough to a first maximum current level when the voltage between the second power supply terminal and the output terminal is less than the predetermined value is a means for limiting the gate-source voltage of the MOS pass transistor to approximately 1.5 volts or less when the voltage between the second power supply terminal and the output terminal is less than approximately 0.8 volts.

6. The circuit of claim 5 wherein the means for limiting the gate-source voltage of the MOS pass transistor to limit the maximum current there through to a second maximum current level when the source to drain voltage of the MOS pass transistor is greater than the predetermined voltage difference and the voltage between the output terminal and the second power supply terminal is greater than the predetermined value is a means for limiting the gate-source voltage of the MOS pass transistor to approximately 2.5 volts or less when the source to drain voltage of the MOS pass transistor is greater than approximately 0.8 volts and the voltage between the output terminal and the second power supply terminal is greater than approximately 0.8 volts.

7. A circuit for coupling between first and second power supply terminals and an output terminal for providing a current limited low dropout voltage output comprising:

a MOS pass transistor having a source, a drain, a gate, and a threshold voltage, the source and drain of the pass transistor being coupled in series between the first power supply terminal and the output terminal;

a first drive circuit having a differential input and a single ended output, the single ended output being coupled to the gate of the MOS pass transistor;

second, third, fourth and fifth transistors, each having a source, a drain, a gate, and a threshold voltage, said third and fourth transistors being connected as diodes;

a second drive circuit having an input connected to said output terminal and an output connected to the gate of said fifth transistor;

the sources of the pass and second transistors being coupled to the first power supply terminal and the output terminal being coupled to the gate of the second transistor;

the drain of the second transistor being coupled to the source of the third transistor, the drain of the third transistor being coupled to the sources of the fourth and fifth transistors and to the gate of the third transistor, and the drains of the fourth and fifth transistors being coupled together and to the gates of the pass and fourth transistors;

the gate of the fifth transistor being coupled to said second drive circuit to be responsive to the voltage on the output terminal to turn off the fifth transistor when the voltage at the output terminal reaches a predetermined level;

whereby at voltages on the output terminal near the voltage on the first power supply terminal, the second transistor will be off thereby the full output voltage range of the first drive circuit may be applied to the gate of the first transistor, at lesser voltages on the output terminal compared to the voltage on the first power supply terminal the second transistor will be on, limiting the gate-source voltage of the first transistor to a forward conduction diode voltage drop of the third and fourth transistors, and at very low output voltages compared to the voltage on the first power supply terminal, the second and fifth transistors will be on, limiting the gate-source voltage of the first transistor to the forward conduction diode voltage drop of the third transistor.

8. The circuit of claim 7 wherein the first power supply terminal is a positive power supply terminal, the first through fifth transistors are P-channel transistors.

9. The circuit of claim 7 wherein the threshold of the second transistor is approximately 0.8 volts.

10. The circuit of claim 9 wherein the threshold of the third transistor is approximately 1.5 volts.

11. The circuit of claim 10 wherein the combined thresholds of the third and fourth transistors is approximately 2.5 volts.

12. The circuit of claim 11 wherein the second and fifth transistors will be on if the voltage on the output terminal is less than approximately 0.8 volts.

13. The circuit of claim 12 wherein the second drive circuit comprises a sixth, seventh, and eighth transistor, each having a source, a drain, a gate and a threshold voltage value, the source of the sixth transistor being coupled to the output terminal, the drains of the sixth and seventh transistors being coupled together and comprising the output of said second drive circuit, the source of said seventh transistor being coupled to the second mower supply terminal, the gates of the sixth and seventh transistors being coupled together and to the drain of said eighth transistor, the drain of the eighth transistor being coupled to a first end of a current source, a second end of the current source being coupled to the output terminal, the source of the eighth transistor being coupled to the first power supply terminal, the gate of the eighth transistor being coupled to the output terminal, said output of said driver circuit being responsive to the voltage on the output terminal to turn on the fifth transistor when the voltage on the output terminal reaches the threshold voltage value of the eighth transistor.

14. The circuit of claim 13 wherein the first power supply terminal is a positive power supply terminal, the first through sixth transistors are P-channel transistors and the seventh and eighth transistors are N-channel transistors.

15. A current limited circuit for coupling to first and second power supply terminals and having an output terminal comprising:

a pass transistor having first and second pass transistor terminals and a mass transistor control terminal for controlling conduction between the first and second mass transistor terminals, the first pass transistor terminal being coupled to the first power supply terminal and the second pass transistor terminal being coupled to the output terminal;

a first circuit coupled to the control terminal of the pass transistor for controlling the voltage at the output terminal responsive to an input to the first circuit;

a second circuit responsive to the voltage between the output terminal and the first power supply terminal to limit the current through the output terminal, irrespective of the input to the first circuit, whenever the voltage between the first and second pass transistor terminals is above a predetermined voltage;

a third circuit responsive to the voltage between the output terminal and the second power supply terminal to further limit the current through the output terminal, irrespective of the input to the first circuit, whenever the voltage between the output terminal and the second power supply terminal is below a predetermined voltage, the further limit of the current being a current greater than zero.

16. A current limited circuit for coupling to first and second power supply terminals and having an output terminal comprising:

a pass transistor having first and second pass transistor terminals and a mass transistor control terminal for controlling conduction between the first and second pass transistor terminals, the first pass transistor terminal being coupled to the first power supply terminal and the second pass transistor terminal being coupled to the output terminal;

a first circuit coupled to the control terminal of the pass transistor for controlling the voltage at the output terminal responsive to an input to the first circuit;

a second circuit responsive to the voltage between the first and second pass transistor terminals to limit the current through the output terminal, irrespective of the input to the first circuit, whenever the voltage between the first and second pass transistor terminals is above a first predetermined voltage;

a third circuit responsive to the voltage between the output terminal and the second power supply terminal and the voltage across the pass transistor to further limit the current through the output terminal, irrespective of the input to the first circuit, whenever the voltage across the pass transistor is above a first predetermined voltage and the voltage between the output terminal and the second power supply terminal is below a second predetermined voltage, the further limit of the current being a current greater than zero.

17. A circuit for coupling between first and second power supply terminals and an output terminal for providing a current limited low dropout voltage output comprising:

a MOS pass transistor having a source, a drain and a gate, the source and drain of the pass transistor being coupled in series between the first power supply terminal and the output terminal;

a complementary double emitter follower buffer having an input and an output, the output of the buffer being coupled to the gate of the MOS pass transistor;

a first drive circuit having first and second differential inputs, and a single ended output, the single ended output being coupled to the input of the buffer for driving the gate of the MOS pass transistor with a low impedance;

a second drive circuit for limiting the gate-source voltage of the MOS pass transistor to limit the maximum current there through to a first maximum current level when the voltage between the second power supply terminal and the output terminal is less than an output voltage predetermined value; and, a third drive circuit for limiting the gate-source voltage of the MOS pass transistor to limit the maximum current there through to a second maximum current level when the source to drain voltage of the MOS pass transistor is greater than a source-drain predetermined voltage difference and the voltage between the output terminal and the second power supply terminal is greater than the output voltage predetermined value, the second maximum current level being greater than the first maximum current level.

18. The circuit of claim 17, wherein the complementary double emitter follower buffer includes a first and second bipolar npn transistors and a first and second bipolar pnp transistors, each transistor having an emitter, a base, and a collector, the base of the first npn transistor being connected to the input of the buffer and to the base of the first pnp transistor, the collector of the first npn transistor being connected to the first power supply terminal, and the emitter of the first npn transistor being connected a first current source, the collector of said first pnp transistor being connected to the second power terminal, the emitter of the first pnp transistor being connected to a second current source and to the base of the second npn transistor, the collector of the first pnp transistor being connected to the second power supply terminal, first the collector of the second npn transistor being connected to the first power supply terminal, the emitter of said second pnp transistor being connected to the gate of the pass transistor and to the emitter of the second pnp transistor, the collector of the second pnp transistor being connected to the second power supply terminal;

the first drive circuit includes a source-coupled differential pair and a current mirror, the differential pair including a second and a third MOS transistor, the current mirror including a fourth and a fifth MOS transistor, each transistor having a source, a drain, and a gate, the sources of the second and the third MOS transistors being coupled together and to a third current source, the gate of the second MOS transistor being coupled to the first differential input and the gate of the third MOS transistor being coupled to the second differential input, the drain of said second MOS transistor comprising the single ended output and being coupled to the drain of the fourth MOS transistor, the drain of the third MOS transistor being coupled to the drain of the fifth MOS transistor.

\* \* \* \* \*

UNITED STATES PATENT AND TRADEMARK OFFICE
CERTIFICATE OF CORRECTION

PATENT NO. : 5,539,603
DATED : July 23, 1996
INVENTOR(S) : David Bingham It is certified that error appears in the above-identified patent and that said Letters Patent is hereby corrected as shown below:

In column 8, claim 13 at line 42, please delete " mower " and insert -- power --.

Signed and Sealed this

Fourth Day of February, 1997

Attest:

BRUCE LEHMAN

*Attesting Officer*  *Commissioner of Patents and Trademarks*